March 5, 1946.　　　H. J. FINDLEY　　　2,396,000
ENGINE COOLING APPARATUS
Filed Aug. 22, 1944
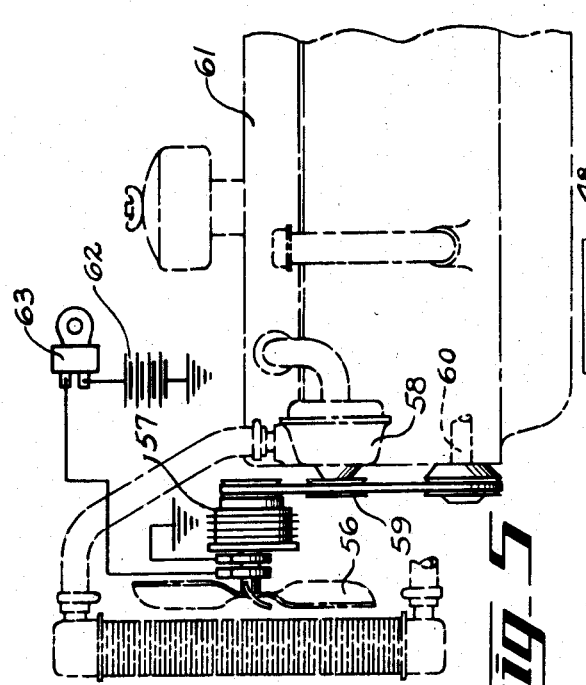
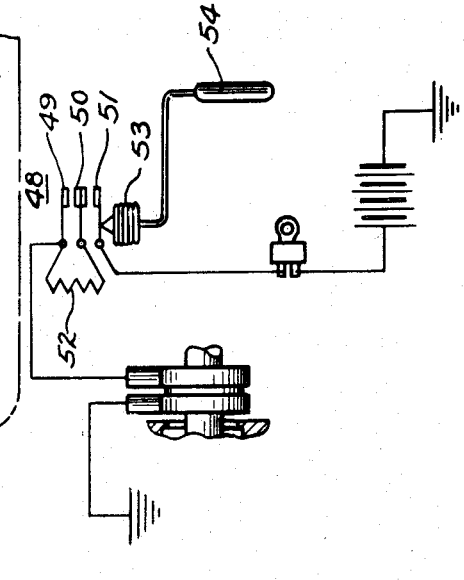
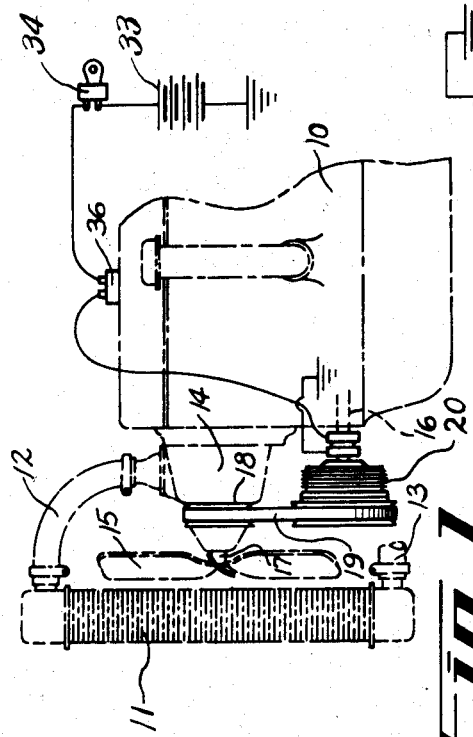
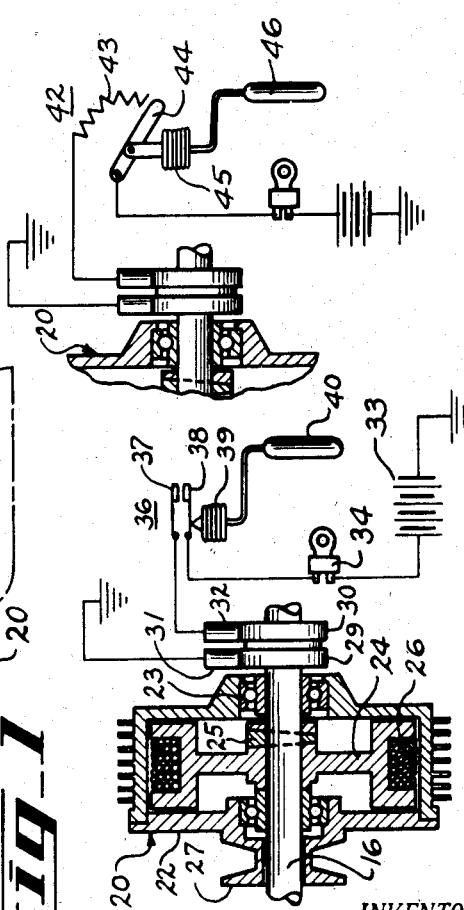
INVENTOR.
HOWARD J. FINDLEY
BY
Kwis Hudson Boughton & Williams
ATTORNEYS Patented Mar. 5, 1946

2,396,000

UNITED STATES PATENT OFFICE 2,396,000

ENGINE COOLING APPARATUS

Howard J. Findley, Chardon, Ohio, assignor to Eaton Manufacturing Company, Cleveland, Ohio, a corporation of Ohio Application August 22, 1944, Serial No. 550,639

11 Claims. (Cl. 123—178)

This invention relates to cooling apparatus for internal combustion engines and aims to provide improved apparatus of this kind which can be applied to variable speed internal combustion engines being used for any purpose but which is especially useful in connection with variable speed internal combustion engines of motor vehicles.

In the normal operation of a motor vehicle driven by a variable speed internal combustion engine such engine operates at speeds which vary through a wide range, for example from 500 R. P. M. to 3000 R. P. M., and when a cooling fan or water pump is driven from the engine in the conventional manner it is usually driven at an excessive speed during a considerable portion of the time particularly during the relatively higher vehicle speeds. During the operation of a motor vehicle at speeds above 50 miles per hour the action of the conventional cooling fan is usually not needed because the forward motion of the vehicle causes sufficient air to pass through the radiator and across the engine to accomplish the desired amount of cooling. If the fan remains connected with the engine during such higher vehicle speeds it wastefully absorbs a substantial percentage of the horsepower developed by the engine. It is also characteristic of certain motor vehicles that on cold days the thermostatic valves usually embodied in the engine cooling system do not open at all and the water pump merely churns water and in doing so wastefully absorbs power from the engine.

Attempts have been made heretofore to employ a clutch for disconnecting the fan from the engine under certain conditions of operation but, so far as I am aware, none of these attempts have turned out to be practical or have been commercially adopted. One of the reasons for the failure of these previous attempts is that they do not satisfactorily meet the cooling requirements of the engine. For example, in certain of these attempts the fan clutch was actuated so as to disconnect the fan in response to a predetermined increase in engine speed and in the case of a vehicle climbing a hill in low gear the cooling action of the fan was decreased at a time when it should have been maintained or increased and overheating of the engine quickly resulted.

The present invention aims to overcome difficulties of the kind above mentioned and provides improved engine cooling apparatus in which a cooling device such as a conventional fan or water pump is driven from a power take-off of the engine through a magnetic coupling which operates with slippage such that the cooling device will be driven at a speed which is substantially constant for all operating speeds of the engine above a predetermined value.

Another object of this invention is to provide improved engine cooling apparatus of this character in which the energization of the magnetic coupling is controlled in response to changes in the operating temperature of the engine such that the speed of the cooling device can be substantially prevented from increasing above a predetermined speed needed for effective cooling of the engine.

A further object of this invention is to provide an improved engine cooling apparatus of the character referred to, wherein the energizing circuit for the magnetic coupling includes means for varying the energization of the coupling so as to select the predetermined speed at which the operation of the fan is to be substantially held.

The invention can be further briefly summarized as consisting in certain novel combinations and arrangements of parts hereinafter described and particularly set out in the appended claims.

In the accompanying sheet of drawings,

Fig. 1 is a partial side elevation showing a variable speed internal combustion engine with which the improved cooling apparatus of the present invention is being used.

Fig. 2 is a diagrammatic view showing the magnetic coupling in section and including the energizing circuit for the coupling.

Fig. 3 is another diagrammatic view showing a modified energizing circuit for the magnetic coupling.

Fig. 4 is another diagrammatic view showing still another energizing circuit for the magnetic coupling, and Fig. 5 is a side elevation similar to that of Fig. 1, but in which only the cooling fan is driven through the magnetic coupling.

In proceeding with a more detailed description of the present invention reference will be made first to the embodiment illustrated in Fig. 1, wherein I show a variable speed internal combustion engine 10 having a cooling system which contains liquid and includes a conventional radiator 11 connected with the engine block by the conduits 12 and 13. The engine cooling system also includes a rotary pump 14 for circulating the liquid through the engine block and radiator and a fan 15 which operates to cause a flow of air through the radiator and across the engine. The engine 10 can be a variable speed engine suitable for any desired use but, more usually, is the driving engine of a motor vehicle and can be a conventional reciprocating internal combustion engine, a rotary internal combustion engine or an internal combustion turbine. The engine 10 is provided at the forward end thereof with a power take-off means which in this instance is in the form of a driven shaft 16.

The rotor of the pump 14 and the fan 15 are mounted on a common shaft 17 which is connected with the shaft 16 of the power take-off means by suitable torque-transmitting means. In this instance the torque-transmitting means includes a pulley 18 mounted on the shaft 17 and a belt 19 extending around such pulley.

An important feature of the present invention is the use of a magnetic or eddy-current coupling 20 in the torque-transmitting means by which the fan and pump are driven from the power take-off shaft 16. The magnetic coupling 20 is adapted to be energized by an electric circuit, which will be further described hereinafter, and operates with slippage so that the maximum speed at which the fan and pump will be driven by the engine 10 will be considerably below the maximum normal operating speed of the engine. The characteristics of the coupling are preferably such that the slippage which takes place will be sufficient to prevent the fan and pump from being driven at a speed greater than that required by the cooling system for effective cooling of the engine during all conditions of operation thereof.

The magnetic coupling 20 is further illustrated in Fig. 2 and comprises, in general, a housing 22 made of magnetic material and supported by suitable bearings 23 for rotation about the power take-off shaft 16 and a rotor 24 located in the housing 22 and attached to the shaft 16 as by means of the pin 25. The rotor 24 is also made of a magnetic material and carries an energizing coil or winding 26. The housing 22 has a pulley 27 connected therewith and around which the belt 19 extends. The pulleys 27 and 18 are of a size to provide an appropriate ratio, such as a 3:1 ratio, such that the fan and pump will be driven at a speed of approximately 1500 R. P. M. for an idling speed of 500 R. P. M. of the engine 10 when the magnetic coupling is energized.

An energizing circuit is provided for the magnetic coupling 20 which includes a pair of slip rings 29 and 30 mounted on the shaft 16 in insulated relation and with which a pair of brushes 31 and 32 cooperate. Energizing current of appropriate characteristics is supplied to the coil 26 from an available source such as the storage battery 33 of the vehicle. The energizing circuit may also include a key controlled switch 34 which can be the conventional ignition switch of the vehicle.

The energization of the magnetic coupling 20 can be controlled or varied in response to changes occurring in the operating temperature of the engine 10. For this purpose the energizing circuit for the magnetic coupling may include a temperature responsive switch 36 located on or adjacent the engine 10 and having a pair of stationary and movable contacts 37 and 38 in the energizing circuit. The movable contact 38 is actuated by a Sylphon or bellows 39 to which fluid under pressure is supplied from a bulb 40. The bellows 39 and the bulb 40 are preferably a part of the switch device 36 which can be mounted on the engine as shown in Fig. 1, the bulb being disposed in the liquid space of the engine so as to be heated by the liquid therein.

In the operation of the engine cooling apparatus above described, the housing 22 of the magnetic coupling 20 rotates freely on the power take-off shaft 16 during the time that the magnetic coupling remains de-energized and at this time the fan 15 and water pump 14 will not be driven. This condition will occur when the engine 10 is being started up from a cold condition. When the temperature of the engine reaches a value high enough to cause closing of the contacts of the switch 36, the magnetic coupling will be energized and the fan and pump will then be driven from the power take-off shaft 16.

During the operation of the engine 10 at various speeds coming within the usual driving range of the vehicle, that is to say, during operation of the engine at speeds varying from an idling speed to a speed corresponding with a vehicle speed of 90 or 100 miles per hour, continuous slippage occurs in the magnetic coupling such that the maximum speed at which the fan and pump will be driven will be materially below the maximum speed of the engine and will remain at a substantially constant speed on the order of the 1500 R. P. M. mentioned above, and hence, these cooling devices will not wastefully absorb power developed by the engine. As indicated above, the characteristics of the magnetic coupling 20 are preferably such that the fan and pump will be driven at an appropriate speed, such as the 1500 R. P. M. mentioned above, to cause effective cooling of the engine and the slippage which occurs in the coupling will be sufficient to prevent the fan and pump from being driven at a speed greater than that needed for such effective cooling of the engine.

In Fig. 3 of the drawing I show another form of energizing circuit for the magnetic coupling 20. In this modified form of energizing circuit the energization of the coupling is controlled by a variable resistance device in the form of a rheostat 42 comprising a resistor 43 and a movable contact arm 44 cooperating therewith. The movable contact 44 is actuated by a Sylphon or bellows 45 to which pressure fluid is supplied from a bulb 46 which is located at an appropriate point in the cooling system so as to be heated by the liquid in such system.

In the operation of the engine cooling apparatus embodying the energizing circuit shown in Fig. 3, the resistance 43 is progressively decreased as the operating temperature of the engine increases to thereby progressively decrease the amount of the continuous slippage which occurs in the magnetic coupling. With this form of energizing circuit for the magnetic coupling, it will be seen that when the engine is operating under conditions such that the temperature thereof is increasing the slippage of the coupling will be correspondingly decreased and the fan and pump will be driven at a progressively increasing speed to render the cooling system of the engine more effective. Conversely when the operating temperature of the engine decreases, the energizations of the coupling will be decreased. The functioning of the rheostat 42, as just described, thus varies the energization and slippage of the magnetic coupling so as to automatically select the predetermined substantially constant speed at which the cooling fan and pump are to be driven.

In Fig. 4 of the drawing I show still another form of energizing circuit for the magnetic coupling in which the energization of the coupling is controlled by a variable resistance device in the form of a temperature responsive switch 48. The switch 48 includes a stationary contact 49 and a pair of movable contacts 50 and 51. The contacts 49 and 50 are connected or shunted by a resistor 52 so that when the contacts 50 and 51 are closed the resistor 52 will be included in the energizing circuit and when the contacts 49 and 50 are closed the resistor will be short-circuited out of the energizing circuit. The variable resistance 48 also includes a Sylphon or bellows 53 for actuating the movable contacts 50 and 51 and which is connected with a bulb 54 containing an expansible fluid and located at a suitable point in the cooling system to be heated by the liquid therein.

In the operation of the engine cooling apparatus embodying the energizing circuit of Fig. 4, the contacts 49 and 50 are open during the usual conditions of operation of the engine and the energization of the coupling is controlled by the opening and closing of the contacts 50 and 51. Under conditions of extreme load, such as when the vehicle is climbing a hill, the operating temperature of the engine may increase to a point which will result in the closing of the contacts 49 and 50. When this occurs the resistor 52 is short-circuited out of the energizing circuit and the continuous slippage occurring in the coupling will be correspondingly decreased in amount and the fan and pump will be driven at a correspondingly increased speed to render the cooling system of the engine more effective.

In Fig. 5 of the drawing, I show engine cooling apparatus similar to that of Fig. 1, but in which only the fan 56 is driven through a magnetic coupling 57 which is substantially identical with the magnetic coupling 20. In this modified apparatus the water pump 58 has a separate pulley 59 enabling it to be driven from the power take-off shaft 60 independently of the fan 56. In this form of the apparatus the pump 58 will be driven continuously at speeds which vary as the speed of the engine 61 is varied, but the fan 56 will be driven through the magnetic coupling 57 which operates with continuous slippage in the manner already explained above.

Fig. 5 also shows one form of energizing circuit for the magnetic coupling 57 in which energizing current is supplied from the storage battery 62 and the energization of the coupling is controlled only by the key-controlled switch 63. It should be understood, however, that the magnetic coupling 57 can also be controlled by the use of any one of the energizing circuits shown in Figs. 2, 3 and 4. Likewise it should be understood that although I have described the cooling apparatus of Fig. 1 as employing the energizing circuit shown in Fig. 2, this apparatus can also be used with either of the modified energizing circuits shown in Figs. 3 and 4.

From the foregoing description and accompanying drawing it will now be readily understood that the present invention provides improved engine cooling apparatus in which a cooling device driven from the engine, such as a conventional fan or water pump, is driven at a speed which will be substantially constant for all engine speeds above a predetermined value and is prevented from being operated at an excessive speed which would wastefully absorb power developed by the engine. It will be seen, moreover, that in my improved apparatus the cooling device is driven through a magnetic coupling which is operable with continuous slippage and is responsive to a temperature controlled energizing circuit such that the speed at which the cooling device is driven by the engine will not materially exceed the speed needed for effective cooling of the engine. When the improved cooling apparatus of this invention is being used, the conventional liquid-controlling thermostats or thermostatic valves can be omitted from the cooling system.

While I have illustrated and described my improved engine cooling apparatus in considerable detail, it will be understood, of course, that I do not wish to be correspondingly limited but regard my invention as including all changes and modifications coming within the spirit of the invention and the scope of the appended claims.

Having thus described my invention, I claim:

1. In combination with a variable speed internal combustion engine having a power take-off and a cooling system embodying a rotary cooling device, a torque-transmitting means connecting said cooling device with said power take-off and including a magnetic coupling which is operable with continuous slippage such that the speed at which said cooling device is driven by said engine will be substantially below the maximum normal operating speed of the engine and the continuous slippage of said coupling being variable in amount so that the speed at which said cooling device is driven will be substantially constant for all operating speeds of the engine above a predetermined valve.

2. In combination with a variable speed internal combustion engine having a power take-off and a cooling system embodying a rotary cooling device, a torque-transmitting means connecting said cooling device with said power take-off and including a magnetic coupling which is operable with continuous slippage such that the speed at which said cooling device is driven by said engine will be substantially below the maximum normal operating speed of the engine and the continuous slippage of said coupling being variable in amount so that the speed at which said cooling device is driven will be substantially constant for all speeds of the engine above a predetermined value, an energizing circuit for said magnetic coupling, and control means in said circuit responsive to changes in the operating temperature of said engine.

3. In combination with a variable speed internal combustion engine having a power take-off and a cooling system embodying a rotary cooling and a cooling system embodying a rotary cooling device, a torque-transmitting means connecting device with said power take-off and including a magnetic coupling which is operable with continuous slippage such that the speed at which said cooling device is driven by said engine will be substantially below the maximum normal operating speed of the engine and the continuous slippage of said coupling being variable in amount so that the speed at which said coolng device is driven will be substantially constant for all speeds of the engine above a predetermined value, an energizing circuit for said magnetic coupling, and control means in said circuit responsive to changes in the operating temperature of said engine, said control means being operable to increase the extent of energization of the coupling and reduce the slippage thereof as the temperature of said engine increases.

4. In combination with a variable speed internal combustion engine having a power take-off and a cooling system embodying a rotary cooling device, a torque-transmitting means connecting said cooling device with said power take-off and including a magnetic coupling, an energizing circuit for said coupling, and control means in said circuit responsive to changes in the operating temperature of said engine, said coupling being operable with continuous slippage and being responsive to said control means so that the speed at which said device is driven by the engine will not materially exceed the speed needed by said system for effective cooling of the engine.

5. In combination with a variable speed internal combustion engine having a power take-off and a cooling system embodying a fan for propelling air in heat-exchange relation to said engine, driving means connecting said fan with said power take-off and including a magnetic coupling which is operable with continuous slippage such that the speed at which said fan is driven by said engine will be substantially below the maximum normal operating speed of the engine and the continuous slippage of said coupling being variable in amount so that the speed at which said fan is driven will be substantially constant for all speeds of the engine above a predetermined value.

6. In combination with a variable speed internal combustion engine having a power take-off and a cooling system embodying a fan for propelling air in heat-exchange relation to said engine, driving means connecting said fan with said power take-off and including a magnetic coupling, an electric circuit for energizing said coupling, and variable-resistance control means in said circuit and responsive to changes in the operating temperature of the engine for varying the energization of the coupling, said coupling being operable with continuous slippage and being responsive to said control means so that the speed at which said fan is driven by said engine will not be materially greater than the speed needed by said system for effective cooling of the engine.

7. In combination with a variable speed internal combustion engine having a power take-off and a cooling system containing liquid and comprising a radiator, a pump for circulating said liquid and a fan for propelling air in heat-exchange relation to said engine and radiator, driving means connecting said pump and fan with said power take-off and including a magnetic coupling which is operable with continuous slippage such that the speed at which said pump and fan are driven by said engine will be substantially below the maximum normal operating speed of the engine and the continuous slippage of said coupling being variable in amount so that the speed at which said fan and pump are driven will be substantially constant for all speeds of the engine above a predetermined value.

8. In combination with a variable speed internal combustion engine having a power take-off and a cooling system containing liquid and comprising a radiator, a pump for circulating said liquid and a fan for propelling air in heat-exchange relation to said engine and radiator, driving means connecting said pump and fan with said power take-off and including a magnetic coupling, an electric circuit for energizing said coupling, and variable-resistance control means in said circuit and responsive to changes in the operating temperature of the engine for varying the energization of the coupling, said coupling being operable with slippage and being responsive to said control means so that the speed at which said pump and fan are driven by said engine will not be materially greater than the speed needed by said system for effective cooling of the engine.

9. In combination with a variable speed internal combustion engine having a power take-off and a cooling system embodying a rotary cooling device, a torque-transmitting means connecting said cooling device with said power take-off, said torque-transmitting means including an eddy-current magnetic coupling which is operable with continuous slippage while energized and through which said cooling device is driven from said engine.

10. In combination with a variable speed internal combustion engine having a power take-off and a cooling system embodying a rotary cooling device, driving means connecting said cooling device with said power take-off and including a magnetic coupling, an electric circuit for energizing said coupling, and variable-resistance control means in said circuit and responsive to changes in the operating temperature of the engine for varying the energization of the coupling, said coupling being operable with slippage and being responsive to said control means so that the speed at which said cooling device is driven by said engine will not be materially greater than the speed needed by said system for effective cooling of the engine.

11. In combination with a variable speed internal combustion engine having a power take-off and a cooling system embodying a rotary cooling device, driving means connecting said cooling device with said power take-off and including a magnetic coupling, an electric circuit for energizing said coupling and having a resistance therein, and switch means responsive to changes in the operating temperature of the engine and having cooperating contacts adapted to be actuated to cause a successive closing of said circuit and short-circuiting of said resistance, said coupling being operable with slippage and being responsive to said switch so that the speed at which said cooling device is driven by said engine will not be materially greater than the speed needed by said system for effective cooling of the engine.

HOWARD J. FINDLEY.